J. B. LYNCH.
TIRE FOR AUTOMOBILES.
APPLICATION FILED JAN. 25, 1917.
1,221,759. Patented Apr. 3, 1917.
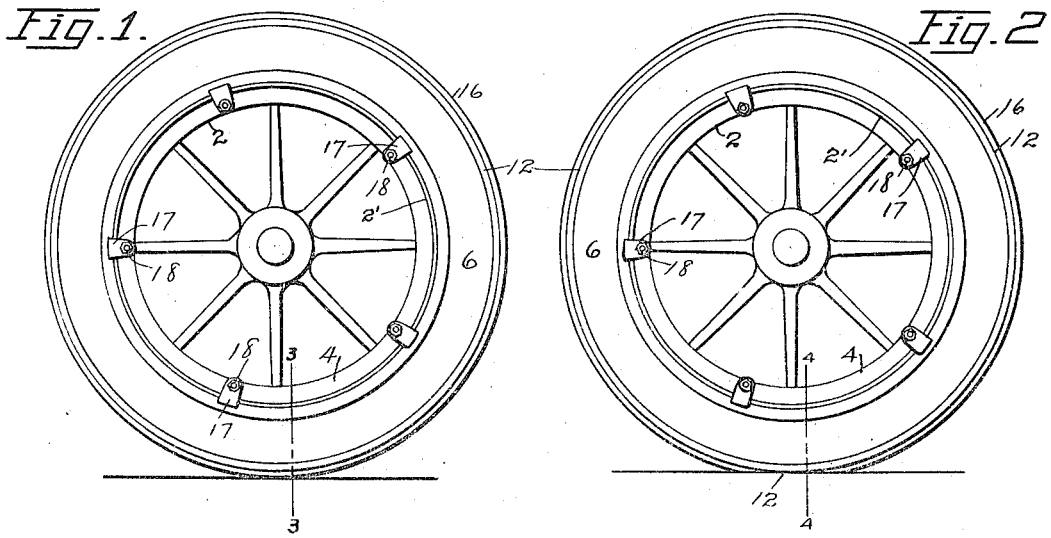
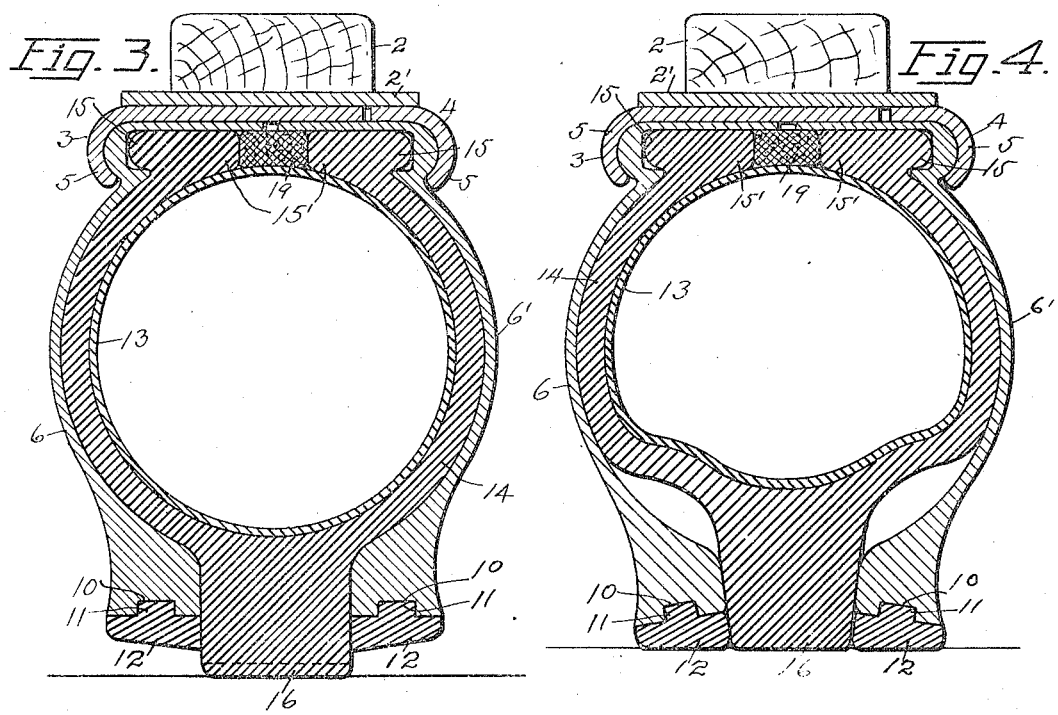
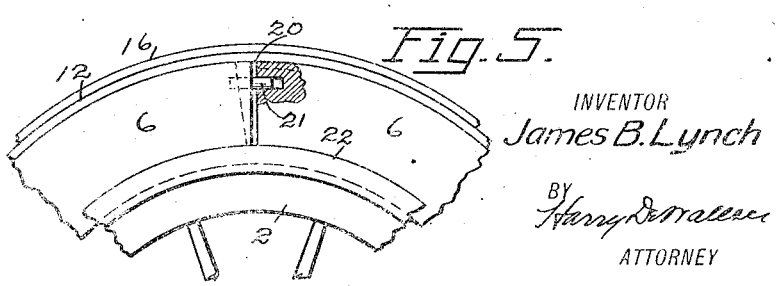
WITNESS
INVENTOR
James B. Lynch
BY
ATTORNEY

UNITED STATES PATENT OFFICE.

JAMES B. LYNCH, OF SYRACUSE, NEW YORK.

TIRE FOR AUTOMOBILES.

1,221,759.  Specification of Letters Patent.  Patented Apr. 3, 1917.

Application filed January 25, 1917. Serial No. 144,415.

*To all whom it may concern:*

Be it known that I, JAMES B. LYNCH, a citizen of the United States, residing at Syracuse, in the county of Onondaga and State of New York, have invented certain new and useful Improvements in Tires for Automobiles, of which the following is a specification.

This invention relates to certain improvements in tires for automobiles and similar vehicles to take the place of the usual pneumatic tires as heretofore constructed.

The object of the present invention is to provide a non-collapsible tire for motor vehicles, in order to avoid the dangers attending the collapse or bursting of the ordinary tires which are so well known. To accomplish this main object, I provide a suitable outer metal casing which may be applied to the standard makes of rims, and is adapted to receive and retain the ordinary pneumatic tire consisting of the rubber-fabric shoe and the inflatable inner tube. A further object is to make the outer casing in similar half-sections so as to facilitate assembling the various parts of the tire upon the rim and at the same time permitting them to be interchanged if necessary, the said sections preferably having a certain amount of flexibility or spring so as to yield toward and away from each other at their peripheral margins under the influence of the varying pressure of air in the inner tube. A further object is to so construct the opposite sections of the outer casing that when placed in position in the rim a medial annular opening occurs between the peripheral portions of said sections to receive a resilient peripheral annular rib or tread which may form a part of the shoe, the said rib projecting beyond the periphery of said sections a sufficient distance to afford the desired resiliency when the inner tube is inflated. A further object is to provide in the periphery of each section of the outer casing an annular groove to receive and retain semi-resilient auxiliary treads to support the load in case the inner tube becomes deflated, thus preventing the complete collapse of the tire and permitting a car to be driven to its destination without injury to the wheels or discomfort to the occupants of the car.

I attain these objects by the means set forth in the detailed description which follows, and as illustrated by the accompanying drawing, in which—

Figure 1 is a side-elevation of a vehicle wheel; showing my improved tire applied to a demountable rim and operating under a normal air pressure.

Fig. 2 is a side-elevation of the wheel; showing the same supported by the auxiliary treads, during the deflation of the pneumatic parts.

Fig. 3 is a transverse sectional view of the tire, taken on line 3—3 of Fig. 1.

Fig. 4 is a transverse sectional view of the same taken on line 4—4 of Fig. 2.

Fig. 5 is a broken elevational view; showing the metallic casing divided transversely for facilitating the springing of the same over the usual clencher rim.

In the drawing, 2—2' represent well-known parts of the felly of a vehicle wheel, to which is applied a demountable rim comprising the usual fixed portion 3, and a removable portion 4, both of said portions preferably being provided with the usual lateral clencher margins 5.

My improved tire comprises an outer metal casing or circular shell, composed of opposite half-sections 6—6', of substantially the same form and size and therefore interchangeable, the said sections being arched outwardly transversely, so as to conform substantially to the cross-sectional form and size of an inner pneumatic tire of the same dimensions. The inner edges of the case-sections 6—6' are provided with transverse annular flanges 7, which engage and overlie the corresponding portions of the rim 3—4, and also with annular beaded flanges 8, which are received by and interlocked with the clencher margins 5 of the rim, the free edges of the flanges 7 being spaced a sufficient distance apart to allow the disengagement of either case-section from the hook-flanges 5. The outer or peripheral margins of the sections 6—6' are curved toward each other, but are normally spaced apart, to form an annular central opening 9 communicating with the interior of the casing, and the peripheral face of each section is provided with an annular groove 10 running parallel to the medial opening 9, for receiving a tongue 11 of an auxiliary tread band 12, which overlies the said face. The treads 12 are preferably composed of rubber, or a suitable composition thereof, having a semi-resilient nature, and sufficiently elastic to be sprung into place on the sections of the casing and to be self-retaining.

The resilient portions of the tire comprise an inner inflatable tube 13, and an outer covering or shoe 14 of rubber or rubber-fabric or equivalent yet durable material, capable of protecting the inner-tube from excessive wear and strain, the said shoe being divided through its inner edge for allowing the insertion of the inner-tube, and provided with the usual annular flanges 15 for interlocking with the bead-flanges 8 of the sections 6—6', and having its free inner margins 15' spaced apart for movement toward each other to facilitate applying and removing the shoe. The shoe 14 is further provided with a relatively thick peripheral annular rib or tread portion 16, preferably composed of resilient rubber. The rib or tread 16 extends radially through the annular opening 9 and beyond the periphery of sections 6—6' and the auxiliary treads 12, to serve as the normal tread of the wheel, as well as to afford the desired resiliency or radial movement of the said tread in passing over obstructions, without liability of contact of the auxiliary treads 12 with the pavement when the inner tube is inflated under the usual pressure (as best seen in Figs. 1 and 3).

The sections 6—6' are preferably made out of spring-steel or other suitable flexible material, so that the lateral arched portions and also the peripheral edges of said sections will flex under the influence of the air pressure confined in the inner tube and shoe. The said sections when properly formed-up preferably tend to approach each other at their peripheral margins (see Fig. 4), to the end that the annular rib 16 at all times snugly fits or fills the medial opening 9 (see Figs. 3 and 4), thus preventing dust or water from entering the interior of the casing.

The ordinary pneumatic tire requires a minimum pressure of about 60 pounds per square inch to properly expand the common rubber-fabric shoe, and if this pressure is maintained the wheel will have the normal resiliency suitable for safe and comfortable service under a given load. It is proposed to construct my specially built shoes 14 in such manner that this minimum pressure will produce approximately the full or adequate expansion of the pneumatic parts, and when my tire is so inflated, the several parts will bear substantially the relation to each other shown in Figs. 1 and 3, in which it will be observed that the inner-tube 13, and the corresponding portions of shoe 14 are substantially circular, and the resilient rib or tread 16 is extended outwardly radially between the peripheral portions of sections 6—6' to the full operative extent, and that the vehicle will thus be supported entirely by the rib 16. This condition and relative disposition of the parts will remain unchanged, except for the slight compressing of the shoe 16 at the point of contact with the roadway, as long as the air pressure in the inner-tube is maintained at the said minimum gage. It is found that at the point of contact of the rib 16 with the pavement or roadway under the conditions last described, owing to the resilient nature of the rib 16, the latter will yield or compress under the load of the car to approximately the extent indicated by the dotted-line 16' in Fig. 3, and that the whole load will be supported resiliently by said rib, supplemented by the air cushion maintained within the shoe. By this construction and arrangement the weight of the vehicle on the treads 16 exerts a counter pressure which at all times is truly radial or toward the center of the pneumatic parts of the tire. In this way the full force and effect of the air cushion is always applied directly and radially to the point of contact between the treads 16 and the roadway. By disposing the case-sections 6—6' outside and around the more or less flexible shoe 14, the latter is prevented from flattening, due to the unrestricted lateral expansion such as is commonly experienced in the ordinary pneumatic tires, when the inner tubes become deflated. The case-sections 6—6' even when expanded to the normal extent shown in Figs. 1 and 3 still possess sufficient flexibility to allow of a slight transverse or outward yielding corresponding to the slight extra compression or contraction of the ribs 16 in passing over bumps or jolty places. But the sections 6—6' owing to their peculiar formation, (including the flanges 7, which are normally firmly held in the rim 3—4), notwithstanding their flexible nature, cannot spread apart at their peripheral edges sufficiently to allow any greater collapse of the pneumatic parts of the tires than that shown in Fig. 4, for the reason that, as soon as the air pressure falls below the minimum pressure required for the normal operation of the tire, as explained, the ribs 16 are forced inwardly by the weight of the vehicle until the peripheral face of the ribs becomes flush with the auxiliary treads 12 and at the same time the peripheral portions of the sections 6—6' automatically spring or move toward each other, thus retaining their tight grip against the rib 16. This causes the adjacent portions of the shoe 14 to immediately recede from the inner peripheral portions of the sections 6—6' to about the extent shown in Fig. 4. No greater collapse of the pneumatic parts is possible owing to the fact that the weight of the vehicle is then thrown entirely upon the auxiliary treads 12, and the vehicle may be driven for a long distance without endangering the deflated tire, and also without discomfort to the occupants of the car. The casing 6—6' prevents the complete collapse or flattening of the pneumatic tire parts, so that there is no danger of the metal rim cutting the shoes, and it will also be impossible to puncture the tire while the vehicle is being trundled along with one or more deflated tires. The outer surface of each tread 12 is preferably slightly beveled, so that when the pneumatic tubes fail, and the treads 12 spring toward each other, the whole tread of the wheel assumes a common plane, as best seen in Fig. 4.

Pressure in excess of 60 pounds per square inch may be applied to the pneumatic parts of my new tires if necessary, the said minimum being merely stated as a convenient basis for a normal or suitable working pressure. If the air pressure in the tire is greatly in excess of 60 pounds the tire becomes so hard and unyielding under the ordinary operation of the car that practically the only resilience obtained is derived from the relatively narrow tread ribs 16.

Owing to the novel construction and arrangement of the present tire including the two auxiliary treads 12, the change from the condition of the wheel when properly inflated (see Fig. 3) to that of the same wheel when the inner tube becomes deflated (see Fig. 4) is so slight as to be hardly noticeable. Especially is this true in case the air pressure is reduced gradually. Even by the sudden bursting or deflation of the inner tube the reduction of the diameter of the wheel (compare Figs. 1 and 3 with Figs. 2 and 4), is not more than one-quarter or one-half of an inch, so that the radial movement of the tread rib 16 of each tire under load is scarcely perceptible.

In assembling the parts of the tire upon the rim 3—4 the section 6 is first placed in position in the part 3, after which the shoe 14 (the inner tube 13 having previously been inserted in the shoe) is placed upon the rim and against the section 6. Section 6' is next placed against the shoe and finally the removable rim 4 is applied between the felly and the inner side of section 6'. The rim 4 may be secured in place by any of the well known devices, as by clips 17 and bolts 18, shown in Figs. 1 and 2, for firmly holding all of the tire parts in position ready for action.

19 represents a ring of felt or similar material which is preferably placed between the free margins of the flanges 15' of the shoe, to prevent the inner tube from contacting with the metal of the shell 6—6'. The use of the felt 19 insures the inner tube being kept in substantially true circular form, which not only prolongs the life of the tube, but also aids in carrying out a main feature of the invention, viz., that of maintaining the inner tube when inflated as nearly cylindrical as possible, so that the air cushion is distributed relatively to the mean radial movement or thrust of the tread 16. The usual skidding chains may be applied to my tires the same as any ordinary pneumatic tires now in use.

Automobiles equipped with my metal case-tires may be laid up or stored away for long intervals and allowed to rest upon the auxiliary treads 12 instead of blocking up the cars as is the custom with the ordinary pneumatic tires.

Fig. 5 shows a slight modification in my outer metal casing, in which the sections of the casing are divided transversely, as at 20, so that they may be expanded sufficiently to be sprung over the outer flanges of the common clencher rim 22 in the operation of placing them in the working position. After the case-sections are sprung into place in the rim the ends are brought together and held from lateral movement by dowel-pins 21. The auxiliary treads 12 are next sprung into position, as described, and these prevent the sections from spreading at the joint 20.

By the provision of the outer metal casing 6—6', I am able to retain the present pneumatic feature which is so much desired by users of automobiles, and by the peculiar and novel construction and arrangement of said case-sections all danger of puncturing the pneumatic parts of the tire is obviated. The inner tubes of my tires may occasionally burst, as at present, but the metal casing prevents the tire from being destroyed or blown to pieces as has been frequently experienced with the common pneumatic tires.

Having thus described my invention, what I claim as new and desire to secure by Letters Patent, is—

1. An automobile tire comprising a hollow spring metal casing composed of circular half-sections normally spaced apart at their peripheral edges, said sections having bead-flanges for interlocking engagement with parts of a demountable rim, and having plane-flanges overlying similar portions of said rim, an inflatable inner tube and a flexible shoe covering said tube, said shoe having an annular tread rib extending through and beyond the peripheral edges of said case-sections and normally held in close contact therewith by the spring tension of the said sections.

2. The combination with the pneumatic tube and the shoe, said shoe having an annular resilient rib, and a demountable rim, of a hollow circular casing composed of spring metal in two parts, said parts normally spaced at their peripheral edges to receive said annular rib and adapted to be interlocked with the demountable rim and to exert their tension for constantly holding their peripheral margins against said resilient rib, and a plurality of auxiliary resilient tread bands overlying the peripheral margins of the parts of said casing parallel to said annular rib.

3. The combination with the pneumatic tube and the shoe, said shoe having an annular resilient rib, and a demountable rim, of a hollow metal casing composed of opposite circular half-sections normally spaced apart at their peripheral edges to receive said annular rib, said sections being flexible and their peripheral edges tending to approach each other for gripping the said annular rib and having annular grooves arranged parallel to said annular rib, said sections having bead-flanges for interlocking with parts of the demountable rim, and a pair of auxiliary resilient treads overlying the peripheral faces of said case-sections and having tongues for entering said annular grooves.

4. An automobile tire including the inner tube, a shoe covering said tube and having an annular resilient tread rib adapted to support the load of the automobile when the inner tube is properly inflated, and a hollow metal casing comprising two oppositely curved sections composed of spring metal, said sections having bead-flanges for interlocking with a demountable rim and having their peripheral edges spaced apart for receiving said annular tread rib, the peripheral edges of said sections overlaid with flexible tread-bands disposed parallel to and contacting with said annular tread rib adapted to support the weight of the automobile when the inner tube becomes deflated.

In testimony whereof I affix my signature.

JAMES B. LYNCH.